United States Patent
Wiktor et al.

(10) Patent No.: US 9,676,673 B2
(45) Date of Patent: Jun. 13, 2017

(54) BIO-BASED REPAIR METHOD FOR CONCRETE

(71) Applicants: Technische Universiteit Delft, Delft (NL); Stichting voor de Technische Wetenschappen, Ultrecht (NL)

(72) Inventors: Virginie Aline Christiane Wiktor, Delft (NL); Hendrik Marius Jonkers, Delft (NL)

(73) Assignees: Technische Universiteit Delft, Delft (NL); Stitchting Voor De Technische Wetenschappen, Utrecht (NL)

( * ) Notice: Subject to any disclaimer, the term of this patent is extended or adjusted under 35 U.S.C. 154(b) by 0 days.

(21) Appl. No.: 14/891,550

(22) PCT Filed: May 16, 2014

(86) PCT No.: PCT/NL2014/050307
§ 371 (c)(1),
(2) Date: Nov. 16, 2015

(87) PCT Pub. No.: WO2014/185781
PCT Pub. Date: Nov. 20, 2014

(65) Prior Publication Data
US 2016/0090328 A1 Mar. 31, 2016

(30) Foreign Application Priority Data

May 17, 2013 (NL) ...................... 2010818

(51) Int. Cl.
*C04B 24/00* (2006.01)
*C04B 41/45* (2006.01)
(Continued)

(52) U.S. Cl.
CPC .......... *C04B 41/455* (2013.01); *C04B 41/009* (2013.01); *C04B 41/5024* (2013.01);
(Continued)

(58) Field of Classification Search
CPC ...................................................... C04B 24/00
See application file for complete search history.

(56) References Cited

U.S. PATENT DOCUMENTS

| 4,536,417 A | 8/1985 | Shimizu | |
| 5,958,131 A * | 9/1999 | Asbridge | .............. C04B 14/106 106/718 |

(Continued)

OTHER PUBLICATIONS

Jonkers et al., "Crack repair by concrete-immobilized bacteria", Proceedings of the First International Conference on Self Healing Materials, Jan. 2007, pp. 1-7.
(Continued)

*Primary Examiner* — Paul Marcantoni
(74) *Attorney, Agent, or Firm* — Sunit Talapatra; Foley & Lardner LLP

(57) ABSTRACT

The invention provides a process for the bio-based reparation of a concrete element having an element surface with cavities, comprising applying a first liquid with a first composition and a second liquid with a second composition to the element surface of the concrete element to provide a combined product to the cavities, wherein the first composition and the second composition are selected to provide gel formation in the cavities after application of one or more of the first liquid and the second liquid to the element surface, wherein the first composition and the second composition are also selected to provide bacterial material, a calcium source, and a nutrient for bacteria in the cavities after application of the first liquid and the second liquid to the element surface, wherein the first liquid at least comprises sodium silicate and wherein the second liquid at least comprises the calcium source.

14 Claims, 7 Drawing Sheets

(51) Int. Cl.
  *C04B 41/00*   (2006.01)
  *C04B 41/52*   (2006.01)
  *C04B 41/70*   (2006.01)
  *C04B 41/50*   (2006.01)
  *C04B 111/72*  (2006.01)

(52) U.S. Cl.
  CPC .......... *C04B 41/5076* (2013.01); *C04B 41/52* (2013.01); *C04B 41/70* (2013.01); *C04B 2111/72* (2013.01)

(56) References Cited

U.S. PATENT DOCUMENTS

| | | | |
|---|---|---|---|
| 8,518,177 B2 * | 8/2013 | Chattopadhyay | C04B 24/14 |
| | | | 106/724 |
| 8,911,549 B2 * | 12/2014 | Jonkers | C04B 20/1022 |
| | | | 106/499 |
| 2005/0120661 A1 | 6/2005 | Paul | |

OTHER PUBLICATIONS

International Search Report and Written Opinion of the International Searching Authority issued in International Patent Application No. PCT/NL2014/050307 mailed Sep. 18, 2014.

Wiktor et al: "Development of a liquid bio-based repair system for aged concrete structures". Concrete repair, rehabilitation and retrofitting III—proceedings of the 3RD international conference on concrete repair, rehabilitation and retrofitting, ICCRRR 2012—concrete repair, rehabilitation and retrofitting III—proceedings of the 3rd in,2012, pp. 955-960.

* cited by examiner

BIO-BASED REPAIR METHOD FOR CONCRETE

CROSS-REFERENCE TO RELATED APPLICATIONS

This application is the National Phase of International Patent Application No. PCT/NL2014/050307, filed May 16, 2014, published on Nov. 20, 2014 as WO 2014/185781 A1, which claims priority to Netherlands Patent Application No. 2010818, filed May 17, 2013. The contents of which are herein incorporated by reference in its entirety.

FIELD OF THE INVENTION

The invention relates to a process for the reparation of concrete. The invention further relates to a kit of parts with material that may be used for the reparation of concrete. Further, the invention also relates to a concrete element repaired with above-mentioned process.

BACKGROUND OF THE INVENTION

Concrete is one of the most used construction material worldwide as it is strong and relatively cheap. Current design for durability is through prescriptive guidance and includes factors such as the disposition of reinforcement to control cracking and crack widths, thickness of concrete cover to reinforcement, quality of concrete and management of water. However, concrete is subjected to a number of degradation processes which hamper the structure to reach its required service life. Problems caused by the corrosion of reinforcement in deteriorating concrete structures are widely encountered across Europe and are recognized as a major limitation upon the durability of many existing structures. The primary reason for premature corrosion is crack formation in the concrete cover. Larger cracks as well as a network of finer cracks allow water, oxygen, chloride, and other aggressive corroding substances to penetrate the concrete matrix to reach the reinforcement. Other forms of deterioration due to processes such as frost action and alkali-silica reaction are less widespread in their occurrence, but no less significant in their effects. Accordingly, to anticipate durability problems during the lifetime of a structure, costly measures of maintenance and repair have to be undertaken.

U.S. Pat. No. 4,536,417, for instance, describes a method for repairing and restoring a deteriorated cement-containing inorganic material such as reinforced concrete by applying a solution of a water-soluble silicate compound to its surface to have it impregnated with said solution, and then top coating said material with cement paste or/and mortar. Further, US2005120660 describes a plastic micro packer for repairing cracks of structure and a method for repairing middle or low pressure cracks using the plastic micro packer. The micro packer is connected to a hole formed in a crack to inject a repairing solution into the crack of a concrete structure, and includes a hollow rubber sleeve having a screw portion formed on the inner surface thereof, a hollow packer body having a screw coupling portion screwed with the screw portion and a nozzle portion connected to a repairing solution injector, a cove, and member connected to the nozzle portion to prevent leakage of repairing solution. The screw portion of the rubber sleeve has a wide top and a narrow bottom, and thereby, is closely contacted to the hole while the lower portion of the screw portion is expanded in a radial direction when the screw coupling portion is screwed with the screw portion. A flange portion is formed at the front end of the rubber sleeve to prevent excessive induction of the rubber sleeve into the hole.

V. Wiktor et al, Concrete Repair, Rehabilitation and Retro fitting III, proceedings of the 3rd international conference on concrete Repair, Rehabilitation and Retro fitting III, ICRRR 2012, 2012, p. 955-960, describes about the development of a liquid bio-based repair system for aged concrete structures.

H. Jonkers et al, Crack repair by concrete-immobilized bacteria, Proceedings of the First International Conference on Self Healing Materials 18-20, Apr. 2007, Noordwijk aan Zee, The Netherlands, Springer, p. 1-7, describes about crack repair by concrete-immobilized bacteria and investigates self-healing potential.

SUMMARY OF THE INVENTION

Prior art solutions to prevent or repair crack formation are often complex and/or expensive. As concrete may suffer from degradation, such as crack formation, we may consider at least two distinct approaches to prevent and/or repair the concrete: (i) development of self-healing concrete for newly build structures, (ii) and the development of repair systems to increase the durability of existing aged concrete elements (such as concrete structures such as bridges, parking decks, etc.). Especially the latter approach is presented in the present application. Hence, it is especially an aspect of the invention to provide an alternative process for reparation of concrete which preferably further at least partly obviates one or more of above-described drawbacks. Further, it may also be desirable to file pores of porous concrete. Hence, it is also an aspect of the invention to provide an alternative process for pore filling of porous concrete which preferably further at least partly obviates one or more of above-described drawbacks.

In a first aspect, the invention provides a process for the bio-based reparation of a concrete element (herein also indicated as "element") having an element surface ("surface") with cavities (such as especially cracks or pores), the process comprising applying a first liquid with a first composition and a second liquid with a second composition to the element surface of the concrete element to provide a combined product to the cavities, wherein the first composition and the second composition are especially selected to provide gel formation in the cavities after application of one or more of the first liquid and the second liquid to the element surface, wherein the first composition and the second composition are also selected to provide bacterial material, a calcium source, and a nutrient for bacteria in the cavities after application of the first liquid and the second liquid to the element surface, wherein especially the first liquid at least comprises a silicate, especially an alkali metal silicate, even more especially sodium silicate, and wherein the second liquid at least comprises the calcium source, such as calcium nitrate. Further, especially the nutrient may comprise (i) a nitrate compound, (ii) a yeast extract, and (iii) one or more of a lactate and a gluconate, and wherein both the first liquid and the second liquid comprise water.

Advantageously, the liquids together or one or more of the liquids alone, form a gel on the element and/or in at least part of the cavities (of the concrete element). This promotes an endurable presence of an ingredient in the liquid in the cavities. Thereby, repair, i.e. bio based repair, of e.g. the cracks may be assisted. This is especially also advantageous for repair of elements of which the surface is not horizontal or of which the surface is a ceiling. Hence, one or both liquids may comprise a gelling agent, that form a gel upon contact with concrete or upon contact with (an ingredient of)

the other liquid. For instance, when sodium silicate (water glass) and a calcium salt are combined in an aqueous environment, a gel may be formed. Therefore, especially one of the liquids, here just by way of example indicated with the term "first liquid", comprises one or more of sodium alginate or sodium silicate, especially sodium silicate, and the other of the liquids, here just by way of example indicated with the term "second liquid", comprises a calcium source. Alternatively or additionally, the "first liquid" may comprise one or more of potassium alginate or potassium silicate, especially potassium silicate. Hence, in an embodiment the first liquid may comprise one or more of sodium alginate, sodium silicate, potassium alginate and potassium silicate, but especially at least comprises a silicate. Especially, the first liquid comprises as silicate substantially only sodium silicate. Herein, the invention is further especially explained in relation to silicate, especially sodium silicate (as component of the first liquid). The calcium source, and optionally also the silicate, especially provide the "building material" for making new structures in the cavities.

The invention does not exclude the use of further liquids, but at least two liquids, the first and the second liquid, are applied. In a specific embodiment, optionally a third liquid is applied, for instance after applying the first and the second liquid. This third liquid may comprise an alginate, especially sodium alginate (especially in those embodiments wherein the first and the second does not comprise an alginate or sodium alginate, respectively). Alternatively or additionally, another third (or further) liquid is applied, which may especially comprise another gelling agent. Such third or further liquid may especially be applied to further immobilize the first and the second liquid at the element surface (and in the cavities), and may thus especially be applied after application of the first liquid and the second liquid.

The liquids may be applied to the element surface by e.g. spraying or coating, or other methods known in the art. One of the liquids may be coated, one of the liquids may be sprayed, or both may be sprayed or both may be coated to the element surface, etc. Hence, in an embodiment the first liquid and the second liquid are applied to the element surface by spraying the liquids on the element surface. This may be done with means know in the art, e.g. a nebulizer, etc.

By applying the liquids to the element surface, which may include applying the liquids to only part of the element surface, also the liquids will enter one or more of the cavities. By applying two liquids to the surface, a combined product, especially a combined liquid, is obtained. In general, it is not intended to provide one of the liquids, let the liquid dry, and then provide the second liquid; it is especially intended to provide a combined liquid to the surface element and the cavities by applying the separate liquids to the element surface (see also below). This combined liquid may (thus) also be formed and/or penetrate into the cavities.

Herein the term "cavity" especially relates to "crack". For instance, crack formation caused by dynamic and static stress on concrete structure elements is due to working loads and permanent load. Thermal and chemical impacts and frost de-icing stress in the pore system of the concrete are also important. Permanent weathering, horizontal surfaces, dark surfaces and sharp edges increase the risk of crack formation and/or flaking due to increased thermal strain and unfavorable stresses in the building component. Cracks may for instance have dimensions such as by way of example 0.1 cm-1 m length and 0.01-10 mm width, though other dimensions may also be possible. However, the term cavity may also relate to pore. Pores have in general dimensions like length, width and depth in the range of 0.1-5 mm. By applying the liquids to the element surface, one or more cavities will automatically at least partly be filled with both liquids. Hence, within the cavities gel formation will take place. Due to the gel formation, transport of the liquid(s) over the element surface or away from the element surface may be reduced or prevented.

Especially, the liquids are applied to the element surface with no or a relative small delay between application of the two (or more) liquids. As suggested above, the liquids may be applied at the same time, e.g. by co-spraying the liquids. However, the two (or more) liquids are especially not applied as combined liquid in one run. A reason not to combine the liquids (into a single composition) before application is that especially the silicate may react with the calcium source, such as calcium lactate or calcium nitrate. Hence, the liquids, at least the first and the second liquid, are applied to the element surface separately.

The first and the second (and optionally further) liquids are applied to the concrete element. As will be clear to the person skilled in the art, the liquids are applied to overlapping areas, such that at such area the liquids combine. The (overlapping) area to which the liquid is applied may vary from application to application, but may for instance be at least 0.5 m$^2$, such as at least 1 m$^2$, like at least 4 m$^2$, such as up to 1,000 m$^2$. However, also very large areas may be subjected to the process of the invention, such as 100 m$^2$ or more, like up to 20,000 m$^2$, or even larger. Upon application of the liquids to the (surface of the) concrete element, the liquids will (also) penetrate into at least part of the cavities.

Instead of a co-application, like co-spraying, the liquids may also be applied one after the other to the element surface. Hence, in an embodiment one of the (first and the second) liquids is applied to the element surface within 0.5 h after applying the other (second of first) liquid to the element surface. Especially, first the first liquid, especially comprising the (sodium) silicate, is applied to the element surface and subsequently the second liquid comprising the calcium source is applied to the element surface. It may be advantageous to apply the solution with silicate first (irrespective whether the concrete is old or young concrete), although it may also be applied the other way around. In case of old concrete, it may restore the alkaline pH of the pore solution (i.e. water that may be present in the pore, which will in general have a high pH). For young concrete, it seems to be advantageous to apply a liquid with similar pH (alkaline), otherwise hydrates, such as Portlandite (Ca(OH)$_2$) and partially CSH (calcium silicate hydrate), can be washed away, which would result in damaging the concrete. Therefore, especially also the second liquid is applied to the element surface within 0.5 h after applying the first liquid to the element surface. Alternatively, the first liquid is applied to the element surface within 0.5 h after applying the second liquid to the element surface. Especially, one or more liquids are aqueous liquids. For instance, especially one or more of the liquids may be solutions. Hence, in embodiments both the first liquid and the second liquid comprise water.

Note that the term "co-application" may in an embodiment especially refer to the simultaneous application but not as a single liquid (or single composition). The different liquids may be applied with separate applicators (i.e. at least different containers for the first and the second liquid, to prevent gel formation), and may combine on the element and/or in the cavity. Hence, herein the liquids are even when simultaneously applied, especially only combined at the surface of the concrete element, and not before application to the concrete elements. Hence, the two (or more) liquids may especially combine at the surface of the concrete element and (thus) also in the cavities of such concrete element.

As indicated above, the first composition and the second composition are selected to provide gel formation in the cavities after application of one or more of the first liquid and the second liquid to the element surface. However, the first composition and the second composition are also selected to provide bacterial material, a calcium source, and a nutrient for bacteria in the cavities after application of the first liquid and the second liquid to the element surface. Would however more than two liquids be applied, in principle the compositions of these two or more liquids may be selected to provide bacterial material, a calcium source, and a nutrient for bacteria in the cavities after application of the two or more liquids to the element surface. As at least one of the liquids would (also) comprises (sodium) silicate, the invention also relates to embodiments wherein (in fact) the first composition and the second composition are also selected to provide (sodium) silicate, bacterial material, a calcium source, and a nutrient for bacteria in the cavities after application of the first liquid and the second liquid to the element surface.

The calcium source is applied to build a new structure in the cavity, i.e. repair a crack. The calcium source may be used e.g. to form a phosphate and/or a carbonate. Especially, the calcium source may be used to form one or more of a phosphate and carbonate in an alkaline medium (due to the presence of the sodium silicate). This new structure is built with the bacteria. Hence, especially the bacterium is selected from the group consisting of bacteria that can form a phosphate or a carbonate precipitate in an alkaline medium. Due to the presence of the (sodium) silicate, the structure(s) that are built—by the bacteria—in the cavity may also comprise silicates. As bacteria are used to repair the cracks (by building calcium structures, such as calcium carbonate and/or calcium phosphate), the process is herein indicated as "bio-based reparation". The calcium source may especially comprise a calcium salt, such as calcium nitrate.

The process herein is especially indicated as "process for the bio-based reparation of a concrete element". However, the process may also be used as prophylactic treatment or preventive treatment. Hence, the process herein may also be defined as "process for the bio-based treatment of a concrete element", such as for reparation and/or prophylactic treatment purposes.

Hence, in a further aspect, the invention also provides a concrete element having an element surface with cavities, wherein one or more of the cavities have a cavity wall on which structures comprising one or more of calcium carbonate and calcium phosphate are formed, wherein these structures have a lower density than the concrete of the concrete element, and wherein the structures further comprise bacterial material. Further, such structures may also comprise sodium silicate (and/or sodium alginate and/or potassium silicate and/or potassium alginate, however especially at least sodium silicate). Such concrete element may (thus) be obtainable by the process as described herein. Especially, within the cavity (of the concrete element) more than 95% of all available cations are selected from sodium and calcium. This composition may differ from the composition of the concrete element (i.e. the surrounding material), as the cavity has been filled with the herein described process. Further, especially the sodium to calcium ratio within the cavity (of the concrete element) is larger than in the surrounding material.

The element may e.g. be comprised by a building or a civil engineering structure, such as a department store, an office building, a bridge, a parking deck, a fly-over, a viaduct, a road, a dam, a dyke, a tunnel, a conduit. As the process of the invention surprisingly improves sealing of the element surface/reduces permeability, the process of the invention may be of especial interest for protection of outdoor structures but also of underground (civil engineering) structures.

To obtain the new (calcium) structures in the cavities, the material provided in one or both liquids should at least include building material, bacteria, and a nutrient for the bacteria. As indicated above, the building material at least comprises calcium from a calcium source. The combination of building material, bacteria, and nutrient for the bacteria may herein also be indicated as "healing agent", or "bio-based healing agent". The healing agent, when incorporated in concrete, may perform autonomous repair of cracks formed in the material when activated by water. The healing agent comprises the bacterial material and preferably also an additive (such as the nutrient).

Hence, the combined product (from the first and the second liquid) (provided to the cavities) can also be indicated as "healing agent" or "bio-based healing agent".

The bacteria are especially provided in dried (powder) form and can especially be either lyophilized vegetative cells or dried bacterial spores. Hence, the bacterial material is selected from the group consisting of a bacterium, a lyophilized bacterium and a bacterial spore of a bacterium. In the liquid, the bacterial material is especially selected from the group consisting of a bacterium and a bacterial spore of a bacterium.

The term "bacterial material" may also refer to a combination of bacterial materials, such as a combination of two or more of the bacterium, the lyophilized bacterium and the bacterial spore of a bacterium. The term "bacterial material" may alternatively or additionally also refer to a combination of different types of bacteria, such as two or more of *Planococcus, Bacillus* and *Sporosarcina*, or such as a combination of an anaerobic bacterium and an aerobic bacterium.

Hence, in an embodiment, the bacterium is selected from the group consisting of bacteria that can form a phosphate or a carbonate precipitate in an alkaline medium (such as calcium carbonate or a calcium phosphate based mineral, like apatite). In an embodiment, the bacterium is selected from the group consisting of aerobic bacteria. An advantage of using aerobic bacteria may be that healing agents comprising bacterial material of aerobic bacteria may be used in application wherein the hardened cementious material is exposed to aerobic conditions. In another embodiment, the bacterium is selected from the group consisting of anaerobic bacteria. An advantage of using anaerobic bacteria may be that healing agents comprising bacterial material of anaerobic bacteria may be used in application wherein the hardened cementious material is exposed to anaerobic conditions, such as underground applications. Preferred bacteria are selected from the group of (facultative aerobic bacteria from genera such as) *Planococcus, Bacillus* and *Sporosarcina*, especially *Bacillus*. Especially bacteria are selected which can grow by anaerobic fermentation and/or anaerobic nitrate reduction.

Hence, in summary the bacterium may be selected from the group consisting of aerobic bacteria or the bacterium is selected from the group consisting of anaerobic bacteria; combinations may also be used. Further, the bacterium may be selected from the group of genera consisting of *Plano-*

*coccus, Bacillus* and *Sporosarcina*. Also, the bacterium may be selected from the group of denitrifying bacteria. Combinations may also be used.

Further, in addition to the bacterial material, the healing agent may comprise a nutrient and a calcium source. The healing agent may comprise one or more organic and/or calcium-containing compounds which can be metabolically converted by active bacteria in an alkaline environment to bio-minerals such as calcium carbonate or calcium phosphate. The organic and/or calcium-containing compounds may produce, after metabolic conversion by bacteria (in an alkaline environment), phosphate and/or carbonate ions, and calcium ions, which form substantially water insoluble precipitates such as calcium carbonate based minerals (like calcite, aragonite, vaterite) and/or calcium phosphate based minerals (e.g. apatite). Examples of organic and/or calcium-containing compounds are organic calcium salts, such as calcium formate, calcium acetate, calcium lactate, calcium gluconate, calcium nitrate, a carbohydrate, a fatty acid, a amino acid, a lactate, a maleate, a formate, a sugar, a pyruvate and an organic phosphate containing compounds, such as a phytate. The calcium-based precursors are herein also indicated as "biomineral precursor" or "calcium biomineral precursor".

In yet a further embodiment, the healing agent comprises a bacterial growth factor, such a selected from the group consisting of a yeast extract, a peptone, an aspartate, a glutamate and trace elements. Preferably, the bacterial growth factor comprises trace elements and one or more selected from the group consisting of a yeast extract, a peptone, an aspartate, and a glutamate. The trace element especially comprises one or more elements selected from the group comprising Zn, Co, Cu, Fe, Mn, Ni, B, P and Mo.

Especially, the healing agent may comprise one or more compounds selected from the group consisting of an organic compound, preferably selected from the group consisting a yeast extract, a peptone, a carbohydrate, a fatty acid, an amino acid, a lactate, a glutamate, an aspartate, a glutamate, a maleate, a formate, a sugar and a pyruvate.

Therefore, in a preferred embodiment, the healing agent comprises (1) one or more compounds selected from the group consisting of calcium formate, calcium acetate, calcium lactate, calcium gluconate, calcium nitrate, a carbohydrate, a fatty acid, a amino acid, a lactate, a maleate, a formate, a sugar, a pyruvate and a phytate and (2) a bacterial growth factor, preferably selected from the group consisting of a yeast extract, a peptone, an aspartate, a glutamate and trace elements. Preferably, the additive comprises a calcium compound and an organic compound (such as, a carbohydrate, a fatty acid, a amino acid, a lactate, a maleate, a formate, a sugar, and a pyruvate), as well as trace elements and one or more of a yeast extract, a peptone, an aspartate, and a glutamate. Instead of or in addition to the organic compound, the additive may also comprise a phytate. In an especially preferred embodiment, the additive comprises (a) a calcium compound, (b) one or more of an organic compound and a phosphor compound (such as phytate), (c) trace elements and (d) one or more of a yeast extract, a peptone, an aspartate, and a glutamate. Especially, the healing agent comprises a calcium compound selected from the group comprising calcium formate, calcium acetate, calcium lactate, calcium nitrate, and calcium gluconate.

Hence, in a specific embodiment, the nutrient comprises one or more compounds selected from the group consisting of an organic compound, a phosphor compound, and a nitrate compound. Especially, the nutrient comprises a nitrate compound. Hence, in an embodiment the nutrient comprise a nitrate compound and one or more other compounds. The nitrate compound may e.g. be provided as calcium nitrate (see also below). Further, the nutrient comprises one or more of a lactate and a gluconate, alternative to nitrate or in addition to nitrate. Especially, the nutrient comprises a yeast extract. This may be necessary for the bacteria to produce the structure in the cavity.

Further, as indicated above, the healing agent especially also comprises one or more of (sodium) alginate and (sodium) silicate, especially at least (sodium) silicate. Alternatively or additionally, the healing agent may comprises one or more of potassium alginate and potassium silicate. Especially, the healing agent comprises as silicate substantially only sodium silicate. Hence, the healing agent can be seen as the combination of the first liquid and the second liquid, such as which may occur on/in the concrete element after application of the first and the second liquid.

It further appears that best results may be obtained when certain concentrations and ratios are maintained. Surprisingly, it appears that good results may be obtained when the molar ratio between silicate (especially defined as $SiO_3^{2-}$) and calcium is in the range of 0.05-5, especially in the range of 0.1-1.0, such as in the range of 0.2-0.8. Further, especially the first liquid comprises sodium silicate in an amount of 0.5-20 wt. %, especially 1-5 wt. %, and especially the first liquid has a pH of at least 10, especially at least 10.5, such as more especially at least 11. The ratio described here is especially the ratio of those components in the combined product in the cavity (especially substantially directly after application on the concrete element). Hence, the user may select the amount of liquids to be applied in such a way to obtain this ratio. Hence, when applying for instance in a prescribed way, such as on the basis of a prescription or user manual, on how to apply the process for the bio-based reparation of a concrete element such ratio may be obtained in the cavity (in the combined product therein).

In an embodiment, the second liquid comprises calcium nitrate. An advantage of using calcium nitrate above e.g. calcium gluconate, is that a rather high concentration calcium can be used. This may promote repair of the cracks. In an embodiment, the second liquid comprises calcium nitrate in an amount of 10-75 wt. %, especially 25-55 wt. %. Hence, in a specific embodiment the second liquid comprises as calcium source only calcium nitrate.

In specific embodiment, the first liquid comprises bacterial spores, sodium gluconate and sodium silicate, and the second liquid comprises bacterial spores and calcium nitrate.

The first and the second liquid are thus different in chemical composition. Especially, one of the liquids (such as the first liquid) comprises silicate and the other (such as the second liquid) does not, and the other liquid (such as the second liquid) comprises calcium, while the one liquid (such as the first liquid) does not comprise calcium.

In a further aspect, the invention also provides a kit of parts comprising a first container and a second container, wherein the first container contains silicate, especially a (soluble) silicate salt, especially sodium silicate, and wherein the second container contains a calcium source, and wherein one or more of the containers further contain bacterial material and a nutrient for bacteria. Such container may include a liquid or the dry materials, (the latter) which upon addition of a liquid provides the first liquid and the second liquid, respectively. Hence, in an embodiment one or more of the containers contain water.

As indicated above, the kit of parts may also include more than two containers. However, especially the (sodium) silicate is not contained in the same container as the calcium compound. The term "container" may relate to a flask, a bottle, a bag, a tin, a can, a drum, etc. etc.

In a specific embodiment, the molar ratio between silicate and calcium is in the range of 0.05-5, especially in the range of 0.1-1.0, such as in the range of 0.2-0.8. This may thus for instance imply that the amount of (sodium) silicate compound(s) and calcium compound(s) over the respective containers is chosen such that this ratio is obtained. As indicated above, in a specific embodiment the first liquid comprises sodium silicate in an amount of 0.5-20 wt. %, especially 1-5 wt. %, and wherein the first liquid has a pH of at least 11. In yet a further specific embodiment the second liquid comprises calcium nitrate, such as the second liquid comprises calcium nitrate in an amount of 10-75 wt. %, especially 25-55 wt. %. Further, in embodiment the first liquid comprises bacterial spores, sodium gluconate and a silicate salt, especially sodium silicate, and wherein the second liquid comprises bacterial spores and calcium nitrate. In a specific embodiment, the kit of parts further comprises a prescription (guide or user manual) how to apply the kit of parts for the bio-based reparation of a concrete element (, and wherein especially the molar ratio between (sodium) silicate and calcium (of those components in those containers) is in the range of 0.05-5 when the kit of parts is applied for the bio-based reparation of a concrete element as prescribed in the prescription).

Hence, in an embodiment one or more of the containers contain water, especially both containers contain water, wherein the first container contains a first liquid en wherein the second container contains a second liquid. Therefore, in a specific embodiment the first liquid comprises sodium silicate in an amount of 0.5-20 wt. %, and wherein the first liquid has a pH of at least 11. In yet a further embodiment, the second container, especially the second liquid (in said container) comprises calcium nitrate. In yet a further embodiment, the second liquid (in said container) comprises calcium nitrate in an amount of 10-75 wt. %, especially 25-55 wt. %. Especially, in an embodiment the first container, especially the first liquid (in said container) comprises bacterial spores, sodium gluconate and sodium silicate, and the second container, especially the second liquid (in said container) comprises bacterial spores and calcium nitrate.

The term "substantially" herein will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 2-4 shown ESEM (Environmental Scanning Electron Microscope) and EDS (Energy Dispersive X-ray Spectrometry (EDS)) graphs of some results of the method of the invention:

FIG. 2: ESEM observation of a polished section of concrete beam treated with (A) bacteria-based solutions, and (B) tap water (control), as well as a polished section of concrete beam treated with bacteria-based solutions, after reloading;

FIG. 4: Elemental analysis (EDS) of the mineral formed along the crack wall;

DETAILED DESCRIPTION

Figure 1:
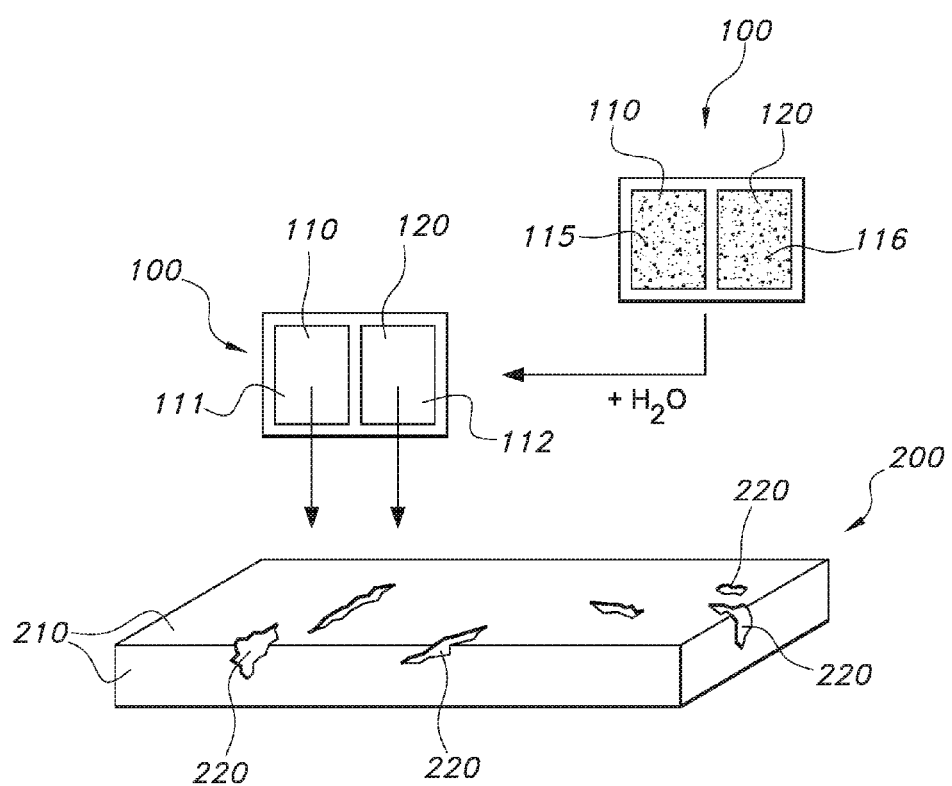
FIG. 1 schematically depicts some aspects of the invention. The drawing is not necessarily on scale.

FIG. 1 schematically shows embodiments and variants of a process for the bio-based reparation of a concrete element 200 having an element surface 210 with cavities 220. The process comprises applying a first liquid 111 with a first composition and a second liquid 112 with a second composition to the element surface 210 of the concrete element 200 to provide a combined product to the cavities. As indicated above, the first composition and the second composition are selected to provide gel formation in the cavities 220 after application of one or more of the first liquid 111 and the second liquid 112 to the element surface 210. As also indicated above, the first composition and the second composition are also selected to provide bacterial material, a calcium source, and a nutrient for bacteria in the cavities 220 after application of the first liquid 111 and the second liquid to the element surface 210, wherein the first liquid 111 at least comprises the sodium silicate and wherein the second liquid 112 at least comprises the calcium source.

To this end, a kit of parts 100 may be provided, comprising a first container 110 and a second container 120, wherein the first container 110 contains a silicate, especially sodium silicate, and wherein the second container 120 contains a calcium source, such as calcium nitrate, wherein one or more of the containers further contain bacterial material and a nutrient for bacteria. Optionally, more containers can be used. For instance, such further container(s) may comprise bacterial material and a nutrient for bacteria. FIG. 1 schematically depicts two variants. For instance, the kit of part may already contain liquids in the containers, which can directly be applied to the element surface 210, for instance by spraying and/or coating. In an alternative variant, the containers contain dry material, or very viscous material, and the contents of the containers are to be combined with liquid, such as water (indicated with the arrow with $H_2O$). This can in an embodiment be added to the containers. However, alternatively the content of the containers is provided to further containers to which the liquid is added. Note however that before applying to the element surface 210, the components are not mixed in such a way that the calcium source and the silicate are in the same liquid. At least two liquids, the first liquid 111 and the second liquid 112, and optionally further liquids, are applied to the element surface 210, wherein one or more liquids contain the sodium silicate and one or more other liquids contain the calcium source. The other ingredients, i.e. the nutrient and the bacterial material can be available in one or more of the containers. The first liquid may be applied first to the cavity/cavities 220, and thereafter the second liquid, or the other way around, or simultaneously.

EXAMPLES

Experiment 1

Injection of Bacteria-Based Solution in Cracked Concrete Beam

Aim of the test: Evaluation of the crack repair efficiency of bacteria-based repair system Description: Optimized repair solution is used in this experiment; calcium nitrate replaces calcium lactate as source of calcium in solution B.

The system is therefore composed of (see also the table below):

Solution A—Sodium-silicate 34.9%—48.5 g/L (alkaline buffer), Sodium-gluconate—125 g/L (Carbon source for bacteria growth), yeast extract—1 g/L ("vitamins" essential elements for bacterial growth), alkaliphilic bacteria—1.6× $10^8$ spores/L. Solution B—Calcium-nitrate—500 g/L (Nitrate source for bacteria growth using denitrification pathway and Calcium for $CaCO_3$ precipitation), yeast extract—1 g/L ("vitamins" essential elements for bacterial growth), alkaliphilic bacteria—1.6×$10^8$ spores/L.

| Ingredient | Concentration (g/L) | |
| --- | --- | --- |
| Solution A - Na-gluconate + Na-silicate | | |
| Na-gluconate | 125 | pH = 11.5 |
| Na-silicate 34.9% | 48.5 | |
| Yeast extract | 1 | |
| Bacterial spores | | 8 × $10^8$ spores/g powder --> |
| (powder) | 0.2 | 1.6 × $10^8$ spores/L |
| Solution N - Ca-Nitrate | | |
| Ca-Nitrate | 500 | pH = 6 |
| Yeast extract | 1 | |
| Bacterial spores | | 8 × $10^8$ spores/g powder --> |
| (powder) | 0.2 | 1.6 × $10^8$ spores/L |

Solution A - Concentration Silicate = 0.139 mol/L
Solution N - Concentration $Ca^{2+}$ = 2.12 mol/L Eight porous network concrete beams are used for this experiment as follow:
- 4 beams for control with 1 tap water injection, 2 are cured in wet chamber (RH=95%) and 2 in dry atmosphere (lab, RH=25%)
- 4 beams to be injected 1 time with optimized bacteria-based solution, 2 are cured in wet chamber and 2 in dry atmosphere (lab) during the repair. Initial loading of the beams is performed to induce a crack. Water permeability test is performed after cracking of the beam and 28 days after injection. The repair of the crack is monitored weekly by observation with stereomicroscope. After 28 days, 1 replicate of each series is re-loaded to assess mechanical properties recovery and further prepared for polished section. The other replicate is kept for further curing and a final permeability test is performed after 100 days.

The recovery of the beam properties (sealing, initial stiffness and ultimate strength) 28 days after repair was determined. The recovery % is calculated according to equation (eq. 1):

$$\text{Recovery}(\%) = \frac{Xf - Xi}{Xi} * 100 \qquad (\text{eq. 1})$$

Where
Xf=value after 28 days (permeability, stiffness or strength)
Xi=initial value, before repair (permeability, stiffness or strength)

The results showed that the control exhibits only a limited decrease in the permeability value while the crack is completely sealed after the treatment with the bacteria-based system. It was also observed that the recovery of the initial stiffness is better for the specimen treated with the bacteria-based solutions, according to the invention, suggesting a good cohesion of the repair material with the initial mortar matrix. Less clear conclusion can be drawn from the results of ultimate strength as the beams used are reinforced with a steel bar. Therefore, in that case we are not testing the concrete itself but more the loading capacity of the steel bar. The evaluation of the repair efficiency with CaNO3 as calcium source is indicated in the table below, with the values indicating the recovery efficiency:

|  | Sealing | Initial stiffness | Ultimate strength |
|---|---|---|---|
| Control | 8.91 | 45.23 | 80.42 |
| Bacteria-based system | 100 | 93.11 | 88.12 |

Figure 2:
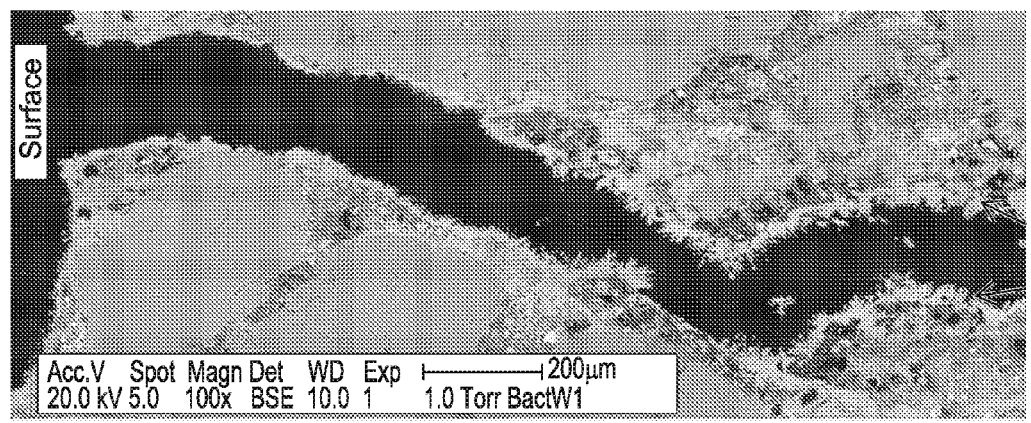
Figure 3A:
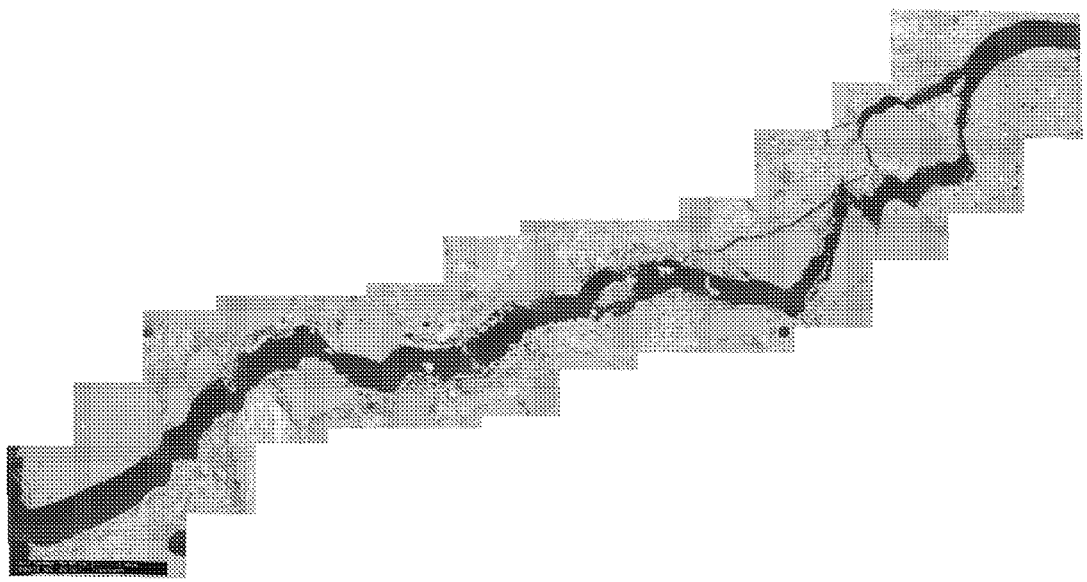
FIG. 3a-3c: ESEM observation of the polished section (location deeper in the crack compared to FIG. 2)
Figure 3B:
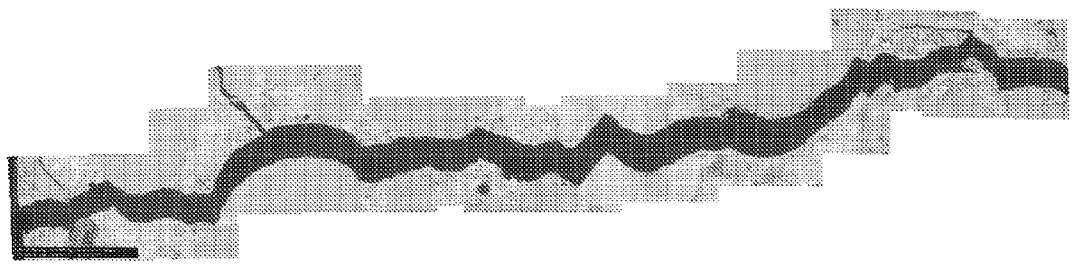

The observation of polished sections after reloading of the beam is presented on FIG. 2. Calcium-based mineral, most probably calcium carbonate, along the crack wall can be observed. It should be stressed that the crack has been re-opened due to the reloading of the beam. However, this observation combined with results from water permeability test suggests that the newly formed mineral indeed bridged the crack. In addition, ESEM observations of the control specimen show that the crack remains empty (see FIGS. 3a-3b).

Figure 3C:
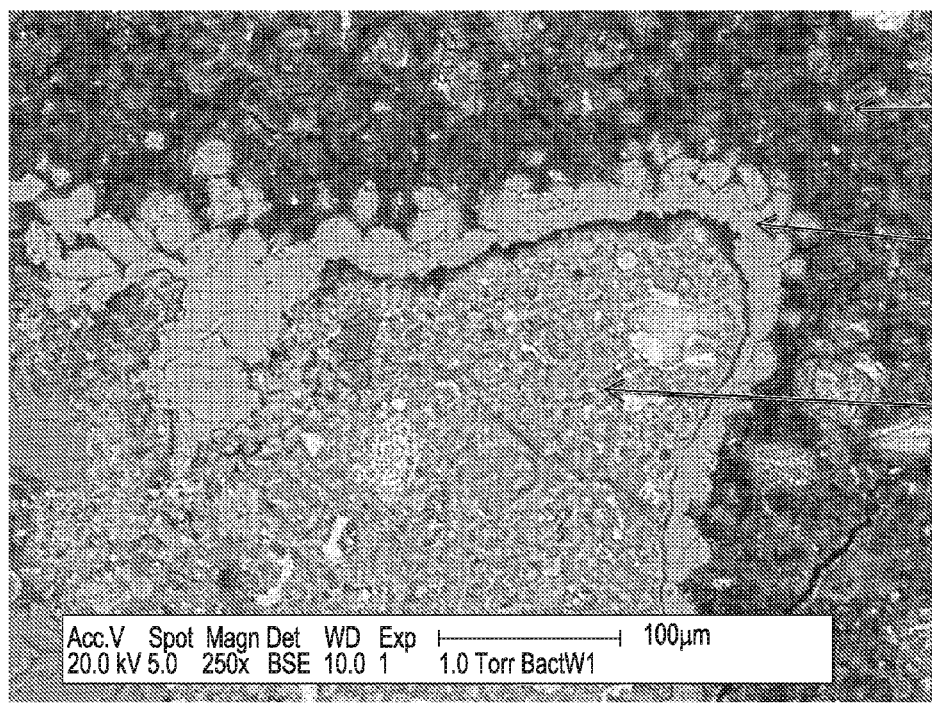
Figure 4:
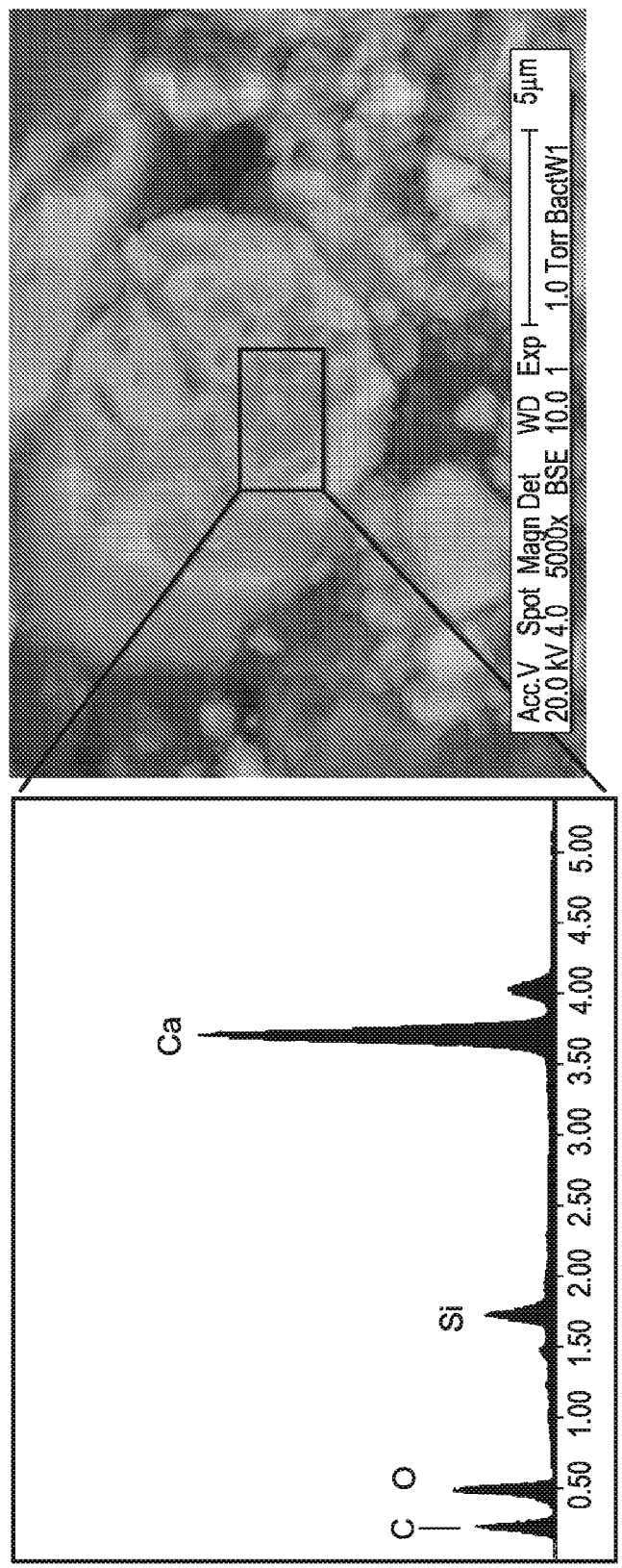

FIG. 3c presents the ESEM observation of the polished section deeper in the crack. It can clearly be seen that Ca-based mineral is formed on top of the mortar matrix (along the crack wall). Elemental analysis of this mineral is shown in FIG. 4. We also noticed the presence of less dense material mainly composed of calcium and silicon. This can be attributed to the gel which is formed upon the mixing of solution A and solution B and also takes part in the repair of the crack.

Figure 5:
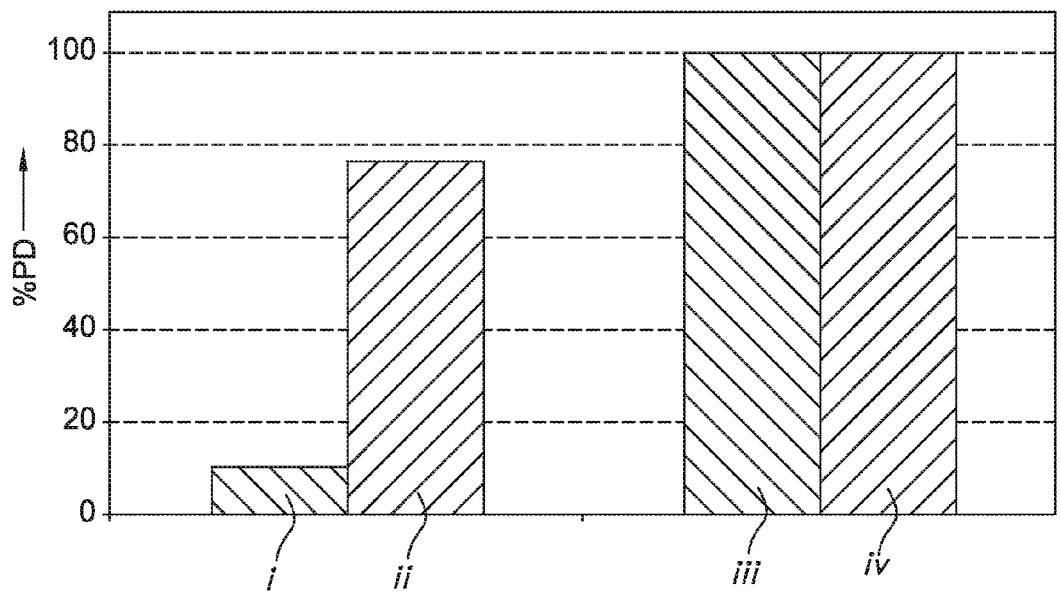
FIG. 5: Effect of curing condition on the repair efficiency, with PD indicating the permeability decrease.

Further, FIG. 5 depicts the effect of curing condition on the repair efficiency. The results show that the curing condition seems to have no effect on the repair with the bacteria-based solution; while the permeability decrease for the control is significantly improved when the specimen is exposed to high relative humidity. This is due to higher carbonation rate of the concrete. References i-ii refer to a control and references iii-iv refer to a test with bacteria; references i and iii refer to 25 relative humidity (RH-25%) and references ii and iv refer to a relative humidity of 95% (RH-95%). However, the observation of polished sections after reloading of the control beam cured in wet conditions (95% RH) shows an empty crack. The decrease in permeability could then be attributed a high carbonation rate at the interface porous core/concrete matrix, which decrease somehow the crack width at that location. On the other hand, the ESEM pictures of the specimen treated with the bacteria-based solution and cured in the same environment (95% RH) shows significant mineral production along the crack wall.

Conclusion: It can be concluded that the treatment with the bacteria-based repair system significantly improved the material properties, especially in term of crack sealing as after 28 days no leaking of the crack is observed. Moreover, evidence that the crack sealing is indeed due to Ca-based mineral formed in the crack has been found with ESEM observation of cross section of the crack. Newly formed mineral is observed along the crack wall for the specimen treated with bacteria-based solution, while for the control specimen the carbonation results in the formation of calcium carbonate within the concrete matrix.

Experiment 2

Evaluation of the $CaCO_3$ Production Capacity and Determination of the Optimum Silicate/Calcium Ratio Aim of the test: Fine tuning of the optimum silicate/calcium molar ratio in combination with kinetic and quantification study of $CaCO_3$ production.

Description: Solutions with various Silicate/Ca molar ratios (0.2<NaS/Ca<0.5) are prepared (NaS is sodium silicate).

|  | concentration | | molar ratio NaS/Ca | | | |
|---|---|---|---|---|---|---|
|  | salt in | NaS in | | | | |
| Calcium salt | solution N | solution A | 1:5 | 1:4 | 1:3 | 1:2 |
| Ca-nitrate $[Ca(NO_3)_2 \cdot 5H_2O]$ | 500 g/L | 48.5 g/L | 1n | 2n | 3n | 4n |
| Time | | 1 week | -w 1 | -w 1 | -w 1 | -w 1 |
|  | | 2 weeks | -w 2 | -w 2 | -w 2 | -w 2 |
|  | | 4 weeks | -w 4 | -w 4 | -w 4 | -w 4 |
|  | | 6 weeks | -w 6 | -w 6 | -w 6 | -w 6 |
|  | | 8 weeks | -w 8 | -w 8 | -w 8 | -w 8 |

The pH and the oxygen concentration in solution are monitored first daily and then weekly to follow the bacterial activity. In parallel solutions are weekly sampled and observed with light microscope to detect biomineral formation.

After 1, 2, 4, 6, and 8 weeks the precipitate & gel is separated by filtration on a sintered-glass filter (pore size 10-16 μm), washed with demi-water, dried at 35° C., grinded, weight and further analyzed with FTIR and DSC/TG for identification and quantification respectively.

In case of significant $CaCO_3$ formation, the precipitate will be analyzed with ESEM to possibly observe bacteria imprints.

Results: From the evolution of the oxygen concentration in solution and the pH respectively as a function of time and silicate/calcium molar ratio it can be seen that the oxygen concentration in solution decreases faster as the silicate/calcium ratio increases suggesting that higher ratio promotes bacteria activity. This can be also correlated with the higher pH value for higher silicate/calcium molar ratios. Moreover, for a same ratio the pH remains constant over 7 days, this means that the system is well buffered due the presence of silicate.

The observation with light microscope shows the mineral formation increases with the silicate/calcium molar ratio. This result combined with the oxygen measurements suggests that the mineral is formed due to bacterial activity.

The infrared results combined to thermal analysis show the presence of amorphous calcium carbonate which tends to progressively crystallize into calcite after 2 weeks. Moreover, the structure of the calcium-silicate hydrates is less ordered at 2 weeks compared to 1 week, which could mean that calcium ions can be more accessible for $CaCO_3$ precipitation.

Conclusion: The results showed that the silicate/calcium ratio has great influence on the mineral formation kinetic, and also probably on its production capacity suggesting the existence of an optimum ratio for the bio mineral formation.

Experiment 3

Experimental Evidence that Extra Calcium (in the Feed) Works Better than the Calcium of the Concrete Alone The purpose of introducing calcium in the feed in the composition of the repair system is twofold:
First, it ensures, by chemical reaction with the silicate compound in solution A (i.e. the solution comprising sodium silicate), the formation of a gel inside the crack or the porosity of the concrete-based material. This gel allows a rapid sealing of the crack (within few hours) and optimum environment for bacteria to precipitate calcium carbonate. This is a relevant feature of this system and is of importance as the bacterial induced precipitation alone is a rather slow process (several weeks). By the time the gel becomes too weak, substantial amount of calcium carbonate has been precipitated by bacteria to seal the crack or fill the porosity of the material.
Second, it ensures that enough calcium is available and distributed within the whole crack volume or porosity of the concrete-based material for the formation of substantial amount of calcium carbonate (sealing/filling mineral).

Besides the necessity of extra calcium for the gel formation, to show that calcium of the concrete alone is not enough for a good repair, the crack sealing efficiency of the repair system with and without extra calcium has been compared. The crack sealing efficiency is reflected by the difference in water permeability before and 28 days after application of repair system.

Figure 6:
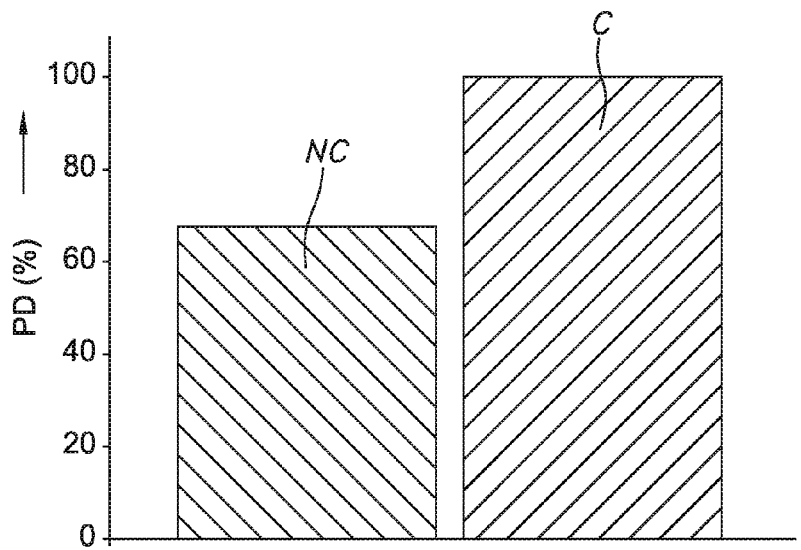
FIG. 6: Comparison of the sealing efficiency of the repair system with and without extra calcium in its composition. NC refers to no $Ca^{2+}$ in the repair solution and C refers to $Ca^{2+}$ in the repair solution with PD indicating the permeability decrease.

The results have shown (FIG. 6) that when no calcium (NC) is added in the composition of the repair system, the crack is only partially sealed with a water permeability decrease of 68%. On the other hand, when extra calcium (C) is added in the repair system the crack is fully sealed as the permeability decreased 100% meaning that the crack was not leaking anymore and that substantial amount of filling material has been produced.

Experiment 4

Impregnation of an Element

The repair system is composed of two solutions:
Solution A, silicate-based solution having an alkaline pH (>10)
Solution B, Calcium-based solution exhibiting a pH of 4-6.
If solution B is first applied on the concrete-based material, which is alkaline (pH>9), it may lead first to a rapid deterioration of the material due to the rapid dissolution of the hydrates of the cement paste. Indeed, the pH difference between solution B and the concrete-based material is such that application first of solution B instead of solution A might be similar to an acid attack.

For this reason, solution A, which has a similar pH to the concrete-based material, may especially be applied first. Then when solution B is applied right after, it reacts immediately with solution A forming a gel. As the silicate-based compound also acts as a buffer, the pH after reaction with solution B remains alkaline. Therefore the repair system applied in this sequence is not detrimental for the concrete-based material while the reverse order would be.

Figure 7:
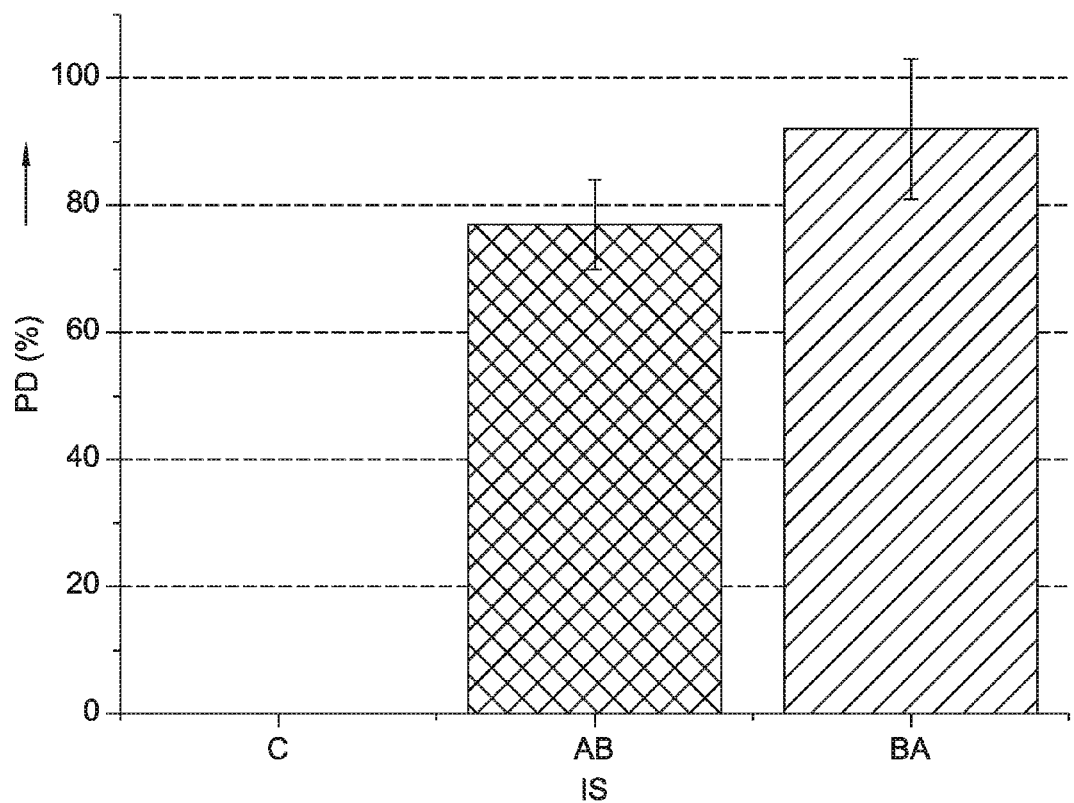
FIG. 7: Influence of sequence order on the crack-sealing efficiency of the bio-based repair system, with PD indicating the permeability decrease.

The effect of the sequence was also tested. FIG. 7 compares the crack-sealing efficiency of the repair system when solution A (silicate-based solution having an alkaline pH (>10)) or solution B (Calcium-based solution exhibiting a pH of 4-6) is applied first. The initial water permeability is measured before application of the repair system. Another test is performed 2 weeks after application of the repair system on cracked concrete specimen. The permeability decrease after permeability test 1 is calculated as follow:

$$P_{decrease}(\%) = \frac{P_0 - P_1}{P_0} \times 100$$

Where $P_0$ is the initial permeability value (before application of the repair system), and $P_1$ is the permeability value of permeability test 1 (after application of the repair system).

The results show that the water permeability was reduced of at least 77% 2 weeks only after application of the repair system. Similar crack-sealing efficiency is observed when solution A is applied first or when solution B is applied prior to solution A.

Experiment 5

The Advantages of Calcium Nitrate Over Other Calcium Sources

The advantage of calcium nitrate over other calcium sources is double:
First, calcium nitrate is a highly soluble salt. Therefore, far more calcium can be added to the repair system when calcium nitrate is used compared for instance to calcium acetate and calcium lactate which are respectively 3.5 and 15 less soluble in water.
Second, nitrate can also be used by the bacteria (denitrification) to mediate calcium carbonate precipitation when oxygen is limited as for instance deep inside a crack.

Figure 8:
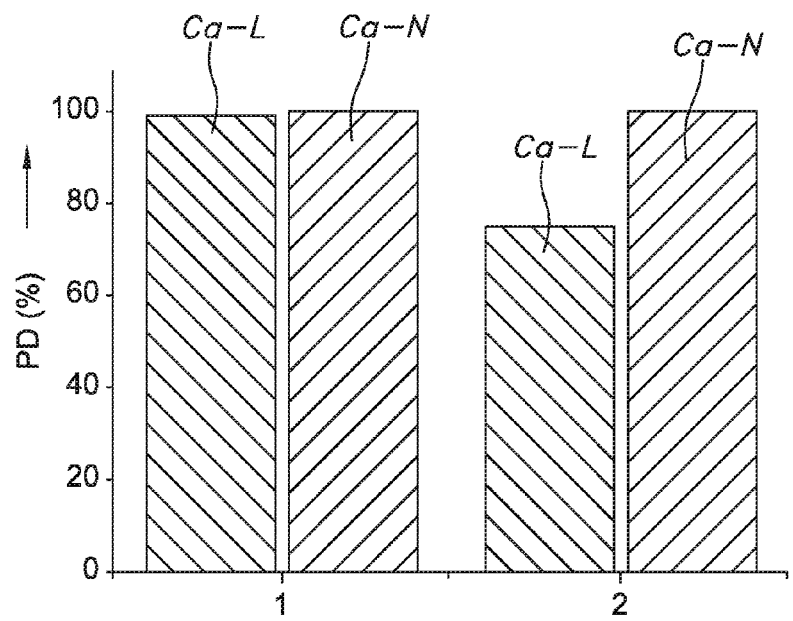
FIG. 8: Comparison of the durability of the repair with calcium lactate and calcium nitrate. The permeability is tested by measuring the permeability decrease (PD). The two left bars indicate the first test and the two right bars the second test. Ca-L refers to the presence of calcium lactate in the repair solution and Ca—N refers to calcium nitrate in the repair solution.
Figure 9:
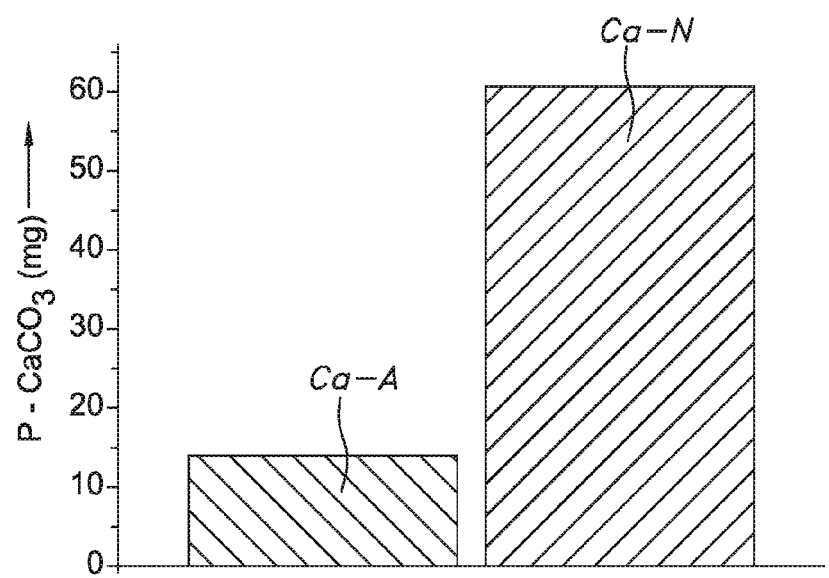
FIG. 9: Quantification by thermogravimetry of calcium carbonate produced in the repair system with calcium acetate or calcium nitrate as calcium source. The $CaCO_3$ production (P—$CaCO_3$) was measured with either calcium acetate (Ca-A) or with calcium nitrate (Ca—N) as calcium source.

The advantage of calcium nitrate over other calcium sources, such as calcium lactate or calcium acetate, has also been shown experimentally through water permeability test (FIG. 8) and quantification of calcium carbonate produced in the repair solution (FIG. 9). In each case, better performance of the repair system is obtained when calcium nitrate is used as calcium source.

FIG. 8 compares the crack-sealing efficiency of the repair system with calcium lactate or calcium nitrate. The water permeability test 1 (left) is performed after application of the repair system on cracked concrete specimen. Another water permeability test (test 2) (right) is performed on the same specimens two weeks at least after the permeability test 1 to evaluate the durability of the repair. The crack sealing efficiency is reflected by the permeability decrease as 100% of decrease in the permeability value means that no water is dripping from the crack and therefore that the crack is completely sealed. If the permeability decrease is <100%, then the crack is only partially sealed as water can still drip from the crack.

The permeability decrease after permeability test 1 is calculated as follow:

$$P_{decrease}(\%) = \frac{P_0 - P_1}{P_0} \times 100$$

Where $P_0$ is the initial permeability value (before application of the repair system), and $P_1$ is the permeability value of permeability test 1 (after application of the repair system).

The permeability decrease after permeability test 2 is calculated as follow:

$$P_{decrease}(\%) = \frac{P_0 - P_2}{P_0} \times 100$$

Where $P_0$ is the initial permeability value (before application of the repair system), and $P_2$ is the permeability value of permeability test 2 (2 weeks at least after permeability test 1).

The results show that, when calcium lactate is used as calcium source in the composition of the repair, the crack appears to be completely sealed after permeability test 1 but is leaking again after permeability test 2. The complete sealing of the crack in permeability test 1 is probably due to the gel formation while after permeability test 2, the gel has become weaker and not enough calcium carbonate has been precipitated by bacteria to fully seal the crack.

On the other hand, with calcium nitrate more calcium is brought to the system which results in more calcium carbonate being formed. This is reflected by 100% in permeability decrease in test 1 and test 2.

The amount of calcium carbonate which can be produced in the repair system when calcium nitrate or calcium acetate is used has been quantified by thermogravimetric analysis. The results (FIG. 9) show that 60 mg of calcium carbonate is produced with calcium nitrate while it is 4 times less with calcium acetate (14 mg). From the other experiments, it is learned that the use of calcium nitrate is better than calcium lactate. From this experiment it is learned that the use of calcium nitrate is better then the use of calcium acetate. Hence, especially at least calcium nitrate is available in the repair solution.

The invention claimed is:

1. A process for the bio-based reparation of a concrete element having an element surface with cavities, the process comprising applying a first liquid with a first composition and a second liquid with a second composition to the element surface of the concrete element to provide a combined product to the cavities, wherein the first composition and the second composition are selected to provide gel formation in the cavities after application of one or more of the first liquid and the second liquid to the element surface, wherein the first composition and the second composition are also selected to provide bacterial material, a calcium source, and a nutrient for bacteria in the cavities after application of the first liquid and the second liquid to the element surface, wherein the first liquid at least comprises sodium silicate in an amount of 0.5-20 wt. %, wherein the second liquid at least comprises the calcium source, wherein the nutrient comprises (i) a nitrate compound, (ii) a yeast extract, and (iii) one or more of a lactate and a gluconate, and wherein both the first liquid and the second liquid comprise water.

2. The process according to claim 1, wherein the molar ratio between silicate and calcium is in the range of 0.05-5.

3. The process according to claim 1, wherein the first liquid comprises sodium silicate in an amount of 0.5-20 wt. %, wherein the first liquid has a pH of at least 11, and wherein the second liquid comprises calcium nitrate in an amount of 10-75 wt. %.

4. The process according to claim 1, wherein the second liquid comprises calcium nitrate.

5. The process according to claim 1, wherein first the first liquid comprising the sodium silicate is applied to the element surface and subsequently the second liquid comprising the calcium source is applied to the element surface.

6. The process according to claim 1, wherein the bacterial material is selected from the group consisting of a bacterium, a lyophilized bacterium and a bacterial spore of a bacterium.

7. The process to claim 6, wherein the bacterium is selected from the group consisting of aerobic bacteria and anaerobic bacteria.

8. The process according to claim 6, wherein the bacterium is selected from the group consisting of bacteria that can form a phosphate or a carbonate precipitate in an alkaline medium.

9. The process according to claim 6, wherein the bacterium is selected from the group of genera consisting of *Planococcus, Bacillus* and *Sporosarcina*.

10. The process according to claim 6, wherein the bacterium is a denitrifying bacterium.

11. The process according to claim 1, wherein the second liquid is applied to the element surface within 0.5 h after applying the first liquid to the element surface, or wherein the first liquid is applied to the element surface within 0.5 h after applying the second liquid to the element surface.

12. The process according to claim 1, wherein the first liquid and the second liquid are applied to the element surface by spraying the liquids on the element surface.

13. The process according to claim 1, wherein the element is comprised by a building or a civil engineering structure.

14. The process according to claim 3, wherein the second liquid comprises calcium nitrate in an amount of 25-55 wt. %.

* * * * *